(12) United States Patent
Kritt et al.

(10) Patent No.: US 8,606,777 B1
(45) Date of Patent: Dec. 10, 2013

(54) RE-RANKING A SEARCH RESULT IN VIEW OF SOCIAL REPUTATION

(75) Inventors: Barry A. Kritt, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/472,273

(22) Filed: May 15, 2012

(51) Int. Cl.
G06F 17/30 (2006.01)

(52) U.S. Cl.
USPC .......................................... 707/723; 707/748

(58) Field of Classification Search
USPC .................................................. 707/723, 748
See application file for complete search history.

(56) References Cited

U.S. PATENT DOCUMENTS

| | | | |
|---|---|---|---|
| 7,908,284 B1 | 3/2011 | Mathes et al. | |
| 8,086,605 B2 * | 12/2011 | Xu et al. | 707/732 |
| 8,224,755 B2 * | 7/2012 | Goodman et al. | 705/317 |
| 8,380,709 B1 * | 2/2013 | Diller et al. | 707/723 |
| 2003/0221163 A1 | 11/2003 | Glover et al. | |
| 2003/0225858 A1 | 12/2003 | Keohane et al. | |
| 2007/0288439 A1 * | 12/2007 | Rappaport et al. | 707/3 |
| 2009/0144259 A1 * | 6/2009 | Sundaresan | 707/5 |
| 2009/0164929 A1 * | 6/2009 | Chen et al. | 715/769 |
| 2010/0088331 A1 * | 4/2010 | White et al. | 707/759 |
| 2010/0257183 A1 * | 10/2010 | Kim et al. | 707/748 |
| 2011/0231383 A1 * | 9/2011 | Smyth et al. | 707/707 |
| 2012/0209832 A1 * | 8/2012 | Neystadt et al. | 707/723 |
| 2012/0215773 A1 * | 8/2012 | Si et al. | 707/723 |
| 2013/0066884 A1 * | 3/2013 | Kast et al. | 707/748 |

OTHER PUBLICATIONS

McNally, Kevin, et al., "Towards a reputation-based model of social web search", IUI 2010: Proceedings of the 14th International Conference on Intelligent User Interfaces, Association for Computing Machinery, Feb. 7, 2010. 10 pages.

* cited by examiner

*Primary Examiner* — Shahid Alam
*Assistant Examiner* — Nargis Sultana
(74) *Attorney, Agent, or Firm* — Marcia L. Doubet

(57) ABSTRACT

A search result is re-ranked/re-ordered in view of a social reputation of a user who will view the search result, where the search result comprises an ordered sequence of identifications of a plurality of network-accessible documents that match a search query. The re-ranking comprises changing an order of at least one of the identified plurality of network-accessible documents within the ordered sequence. The search result is then rendered, as re-ranked, for the user.

12 Claims, 4 Drawing Sheets

RE-RANKING A SEARCH RESULT IN VIEW OF SOCIAL REPUTATION

BACKGROUND

The present invention relates to computing systems, and deals more particularly with searches that use computing systems to locate network-accessible documents. Still more particularly, the present invention relates to re-ranking results obtained from a search in view of social reputation information pertaining to a person who will view the results of the search.

The reputation of a person or entity is generally an opinion, held by others, of the person or entity based on some criteria. The criteria may be subjective in nature. Reputation can be an important factor in many fields, including business and education as well as personal endeavors.

In the so-called "social networking" sites that are provided using online communication networks, a reputation score may be assigned to a person or entity within the scope of the social networking site. With reference to a person, the reputation score may be used to describe the person's knowledge level, interest level, contributions or postings on the site, and/or capabilities in a particular domain. In some social networking sites, a facility is provided whereby person can explicitly evaluate or recommend other people, and a reputation score may be derived from this information.

BRIEF SUMMARY

The present invention is directed to ordering a search result. In one aspect, this comprises: performing a search of network-accessible documents using a search query; obtaining a search result, responsive to the performing, the search result comprising an ordered sequence of identifications of a plurality of the network-accessible documents that match the search query; determining a social reputation score of a user for whom the obtained search result will be rendered; re-ranking the search result, based on the social reputation score, by changing an order of at least one of the identified plurality of network-accessible documents within the ordered sequence; and rendering, for the user, the search result as re-ranked.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Figure 1:
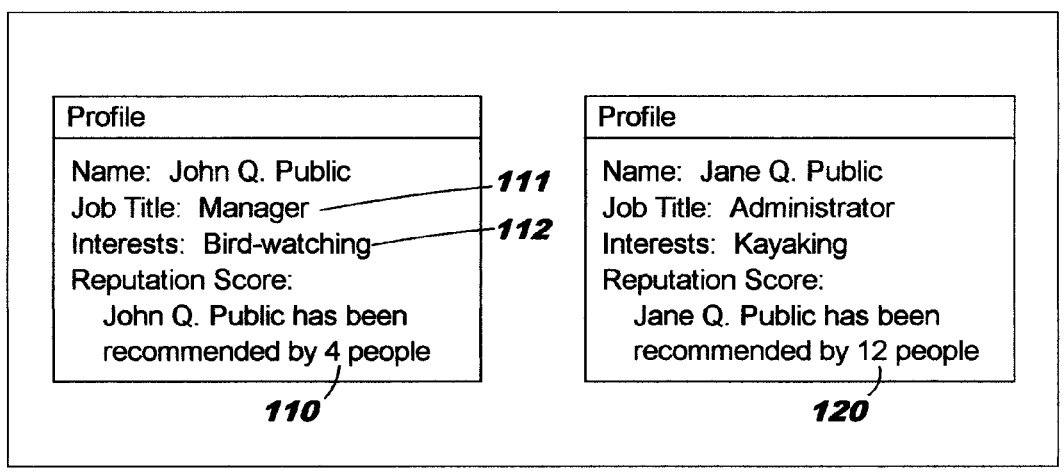
FIG. 1 depicts an example of a person's reputation score within the domain of a hypothetical social networking site.

The present invention is directed to ordering a search result, and more particularly to re-ranking (also referred to herein as "re-ordering") a search result in view of a social reputation. As noted earlier, in some social networking sites, a facility is provided whereby person can explicitly evaluate or recommend other people. An example of a graphical user interface display 100 that might be used in a hypothetical social networking site is depicted in FIG. 1. Information for two site users is shown therein, indicating that a user "John Q. Public" has earned a reputation score of +4 (see 110) from input provided by other users of the social networking site while a user "Jane Q. Public" has earned a reputation score of +12 (see 120) from input provided by users of this same social networking site. The evaluations on which the reputation scores are based may be made in view of the rated person's capabilities, knowledge level, work quality in a particular field, interest in a particular field, contributions/postings, and/or other criteria.

While not illustrated in FIG. 1, it may happen that a plurality of domain-specific or criteria-specific reputation scores are used by a particular social networking site. As an example, one reputation score might pertain to a user's business skills and a different reputation score might pertain to the user's educational background. Note also that the value of a particular social reputation score might be indicative of a person's understanding or expertise. If a score is maintained for a "business skills" category, for example, a relatively high reputation score for this category may indicate that the person has an in-depth understanding of business issues, whereas a lower reputation score for this category may indicate that the person has difficulty understanding business issues or has little to no experience dealing with business issues. (As will be recognized, evaluations may be performed in many different ways using many different types of criteria. Thus, the examples provided herein are by way of illustration but not of limitation.)

When a user performs a search of network-accessible documents (such as Web pages), results of the search are typically displayed as a list of descriptive information pertaining to each of a plurality of documents matching the search query and a corresponding selectable link with which each of these documents can be accessed. The selectable links are typically presented as Uniform Resource Locators ("URLs") and the corresponding descriptive information is aimed at guiding the user in choosing which of the links to access. The search results are typically ordered according to an expected relevance of the located documents to the search query. These concepts are readily understood by those of ordinary skill in the art. As is also readily understood, a user who is viewing the search results might select one or more of the selectable links, in turn, to peruse selected ones of the documents that are accessible from the selectable links.

In the general case, when comparing the ability of two different people to interact with search results in this manner, it may happen that a person who is a relative novice in a particular field to which the search is directed prefers different selections from the search results as compared to a person who is more skilled and/or experienced in that particular field. The more highly-skilled person might prefer more detailed or technically-oriented documents from the search results, for example, whereas the novice might prefer documents that address the searched-for topic at a more basic or overview level.

Accordingly, an embodiment of the present invention is directed to re-ranking a set of search results (also referred to herein as "a search result") into a new order and then redisplaying the re-ranked search results in the new order, where the re-ranking is performed in view of a social reputation score of the user who will view the displayed search results. Therefore, for the same set of search results, different users will see the results in a different order (unless the users happen to have the same social reputation score). Different users may therefore effectively see different search results. For example, when the search results exceed the viewable display space, then search results presented to a first user as the first page of results might not be viewable as the first page of results shown to a second user because those results could appear in a later, non-displayed portion of the results initially presented to the second user.

In the general case, according to an embodiment of the present invention, when a user performs an Internet search and one or more documents D1, D2, . . . DN are located in response, a first user may view these search results with the documents in that same order D1, D2, . . . DN while a second user may view these search results with the documents ordered as DN, DN−1, . . . D2, D1 and a third order views these search results with the documents ordered as D3, D5, D7, . . . , and so forth.

Suppose, by way of example, that User "A" has a reputation score of 1 in a "business intelligence" category, whereas another User "B" has a reputation score of 10 in that same category. When a set of search results is obtained, an embodiment of the present invention obtains the reputation score of the user for whom the results will be presented, and will re-rank the order of the documents in the search results in view of that reputation score. User "A" might therefore be initially presented (i.e., on the first page of the results display) with selectable documents from the search results which are directed to a more basic level of business intelligence, whereas User "B" might be initially presented with selectable documents (from those same search results) that are directed to a more advanced level of business intelligence. (Note that a preferred embodiment of the present invention does not remove documents from the search results, and therefore all users would find the same collection of documents upon paging through all pages of the search results display, although presented in a different order.)

Techniques disclosed herein for re-ranking documents within search results may also be used to re-rank advertisements which will be displayed to a user. If an advertisement pertains to college-level business courses, for example, then different advertisement content might be presented to a user having a high reputation score in a business intelligence category as compared to a user who has a lower reputation score in the business intelligence category—such as an advertisement for an Executive MBA program versus for an advertisement for an introductory business management course. Or, the advertisement selected for the user with the lower reputation score might be taken from a completely different field of interest, based on the user's lower score.

Figure 2:
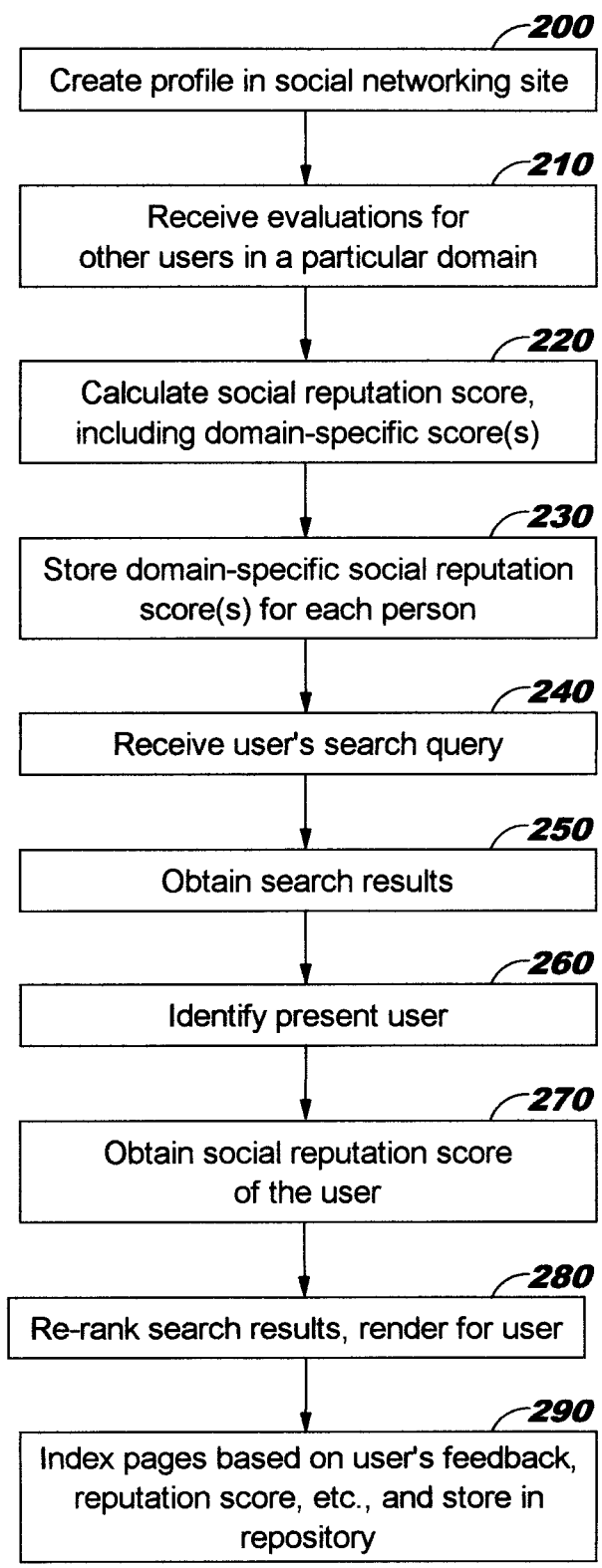
FIG. 2 provides a flowchart depicting logic which may be used when implementing an embodiment of the present invention.

Referring now to FIG. 2, a flowchart is provided that depicts logic which may be used when implementing an embodiment of the present invention.

A profile is preferably created for each user of a social networking site (Block 200). This profile may be used to store the reputation score for the user (and may be a profile used to store other information of the social reputation site). Over time, evaluations for users are received from other users of the social networking site (Block 210), where these evaluations may be domain-specific. With reference to FIG. 1, for example, user John Q. Public might be evaluated for his job skills as a Manager (see 111), and might be separately evaluated for his interest in bird-watching (see 112), although separate domain-specific reputation scores have not been illustrated in FIG. 1.

The evaluations which are gathered from other users are preferably used to calculate a social reputation score for each user of the social networking site (Block 220), and this may comprise domain-specific scores as has been discussed above. When domain-specific scores are used, a particular user may have widely varying reputation scores for different domains. Preferably, the reputation score for each user is stored (Block 230) in the user profile that was discussed above with reference to Block 200.

In one approach, a social recommendation score may be computed by simply summing the number of positive recommendations for each user, and subtracting any negative evaluations from this sum. Alternatively, various types of additional and/or different calculations may be performed to determine a social reputation score, and more than one calculation may be used, if desired for a particular embodiment of the present invention. For example, a weighting factor may be used, whereby an evaluation from a person who has a high value for his or her own reputation score may be weighted more heavily than an evaluation from a person who has a lower reputation score. As another example, a user's contributions or postings to the social networking site may be monitored, and this information may be factored into the person's social reputation score.

At some point, a user performs a search (Block 240) and results are obtained for that search (Block 250). As will be readily understood, the search results include a set of selectable links, where any of these selectable links can be activated to retrieve a corresponding document that will then be displayed to the user. (Note that while discussions herein refer primarily to "displaying" information to a user, this is by way of illustration and not of limitation. An embodiment of the present invention may use a different type of rendering, such as an audible rendering, and such alternatives are within the scope of the present invention.)

An identification is obtained of the user of the computing device on which the results will be displayed (Block 260). This may comprise accessing stored information on the computing device, such as the user's log-on name or other identifying information. This identification is used to locate the user's profile and to thereby obtain the relevant social reputation score for the user (Block 270). In an alternative approach, the functionality of Blocks 260 and 270 may be combined by obtaining a currently-active profile associated with the computing device and obtaining the relevant social reputation score from that profile.

The search results are then re-ranked (Block 280) in view of the social reputation score and re-displayed to the user in a new order according to this re-ranking. (It may happen, in some cases, that the user's social reputation score indicates that the original order of the search results is the preferred order for this user.)

Block 290 describes a monitoring process whereby network-accessible documents are indexed based on factors such as (by way of example) user feedback from users who access those documents, reputation score of users who access those documents, and so forth, and this information is stored in a repository for future use when re-ranking search results. (The processing of Block 290 may therefore precede the processing of any or all of Blocks 200-280, as a preprocessing operation, such that the obtained information is available for use upon reaching Block 280. Or, as another approach, the processing of Block 290 may be performed only for documents located for a particular search, in which case the processing of Block 290 suitably precedes the processing of Block 280.) The information stored in the repository by Block 290 for a particular document may be termed a "relevance indicator" of the document. User feedback might comprise, by way of example, asking users who access a particular document to indicate the skill level of a person who is most likely to benefit from the content of that document. Or, the user feedback might comprise asking users whether they thought the content of the accessed document was helpful, and then storing the user's response in association with the reputation score of the user who is providing the feedback. If a particular document is thought to be highly helpful to users having a particular value for their reputation score within a particular domain, for example, then an embodiment of the present invention may use this feedback to increase the document's ranking when the document is located within search results for another user who has a similar value for his or her reputation score.

As can be seen from the above discussion, an embodiment of the present invention provides for re-ranking a search result in view of a social reputation of a user, and may therefore present a user with a more user-directed and/or relevant set of selectable documents within a set of search results, as compared to using known techniques.

Figure 3:
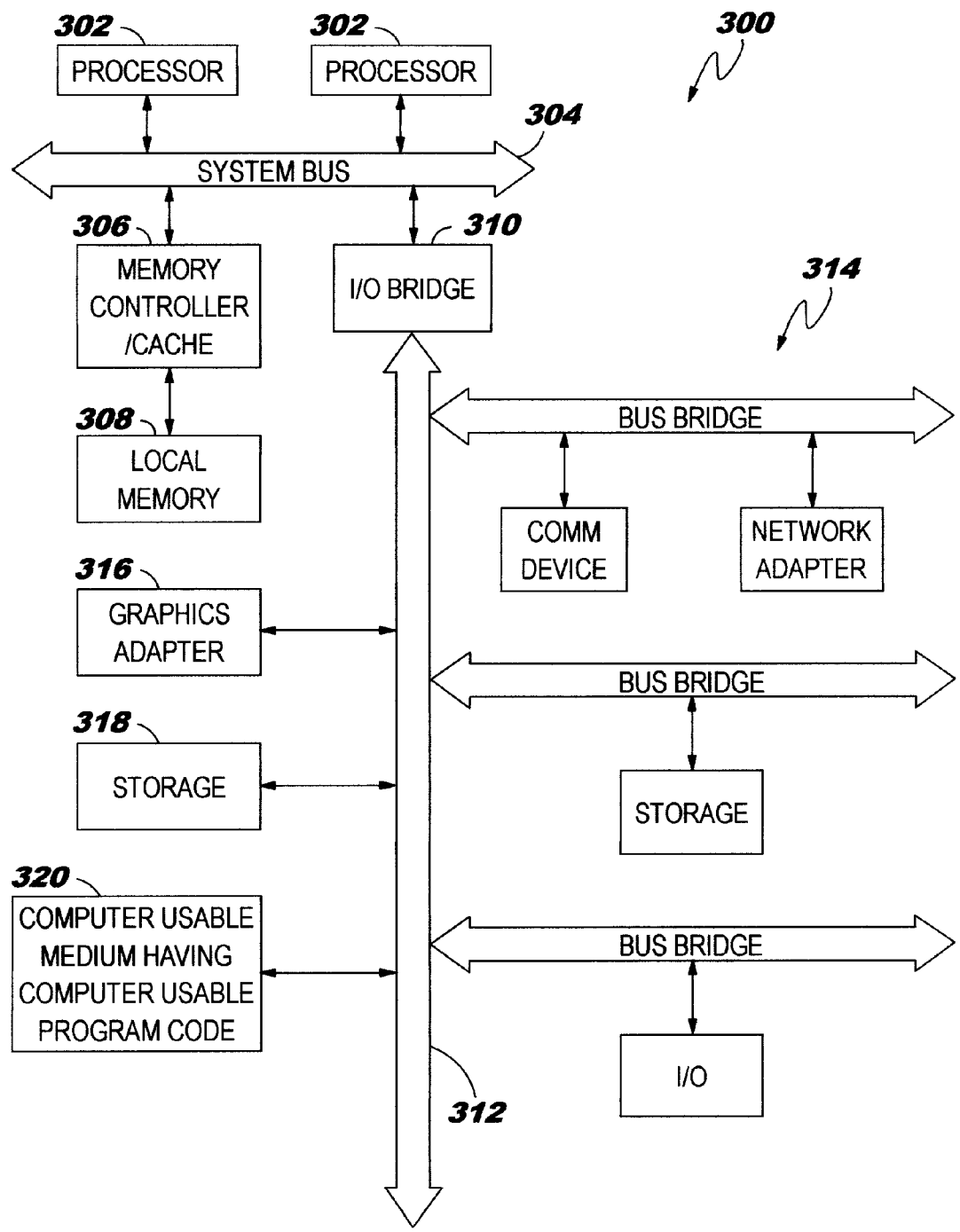
FIG. 3 depicts a data processing system suitable for storing and/or executing program code.

Referring now to FIG. 3, a block diagram of a data processing system is depicted in accordance with the present invention. Data processing system 300, such as one of the processing devices described herein, may comprise a symmetric multiprocessor ("SMP") system or other configuration including a plurality of processors 302 connected to system bus 304. Alternatively, a single processor 302 may be employed. Also connected to system bus 304 is memory controller/cache 306, which provides an interface to local memory 308. An I/O bridge 310 is connected to the system bus 304 and provides an interface to an I/O bus 312. The I/O bus may be utilized to support one or more buses 314 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318, and a computer usable storage medium 320 having computer usable program code embodied thereon. The computer usable program code may be executed to execute any aspect of the present invention, as have been described herein.

The data processing system depicted in FIG. 3 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 4:
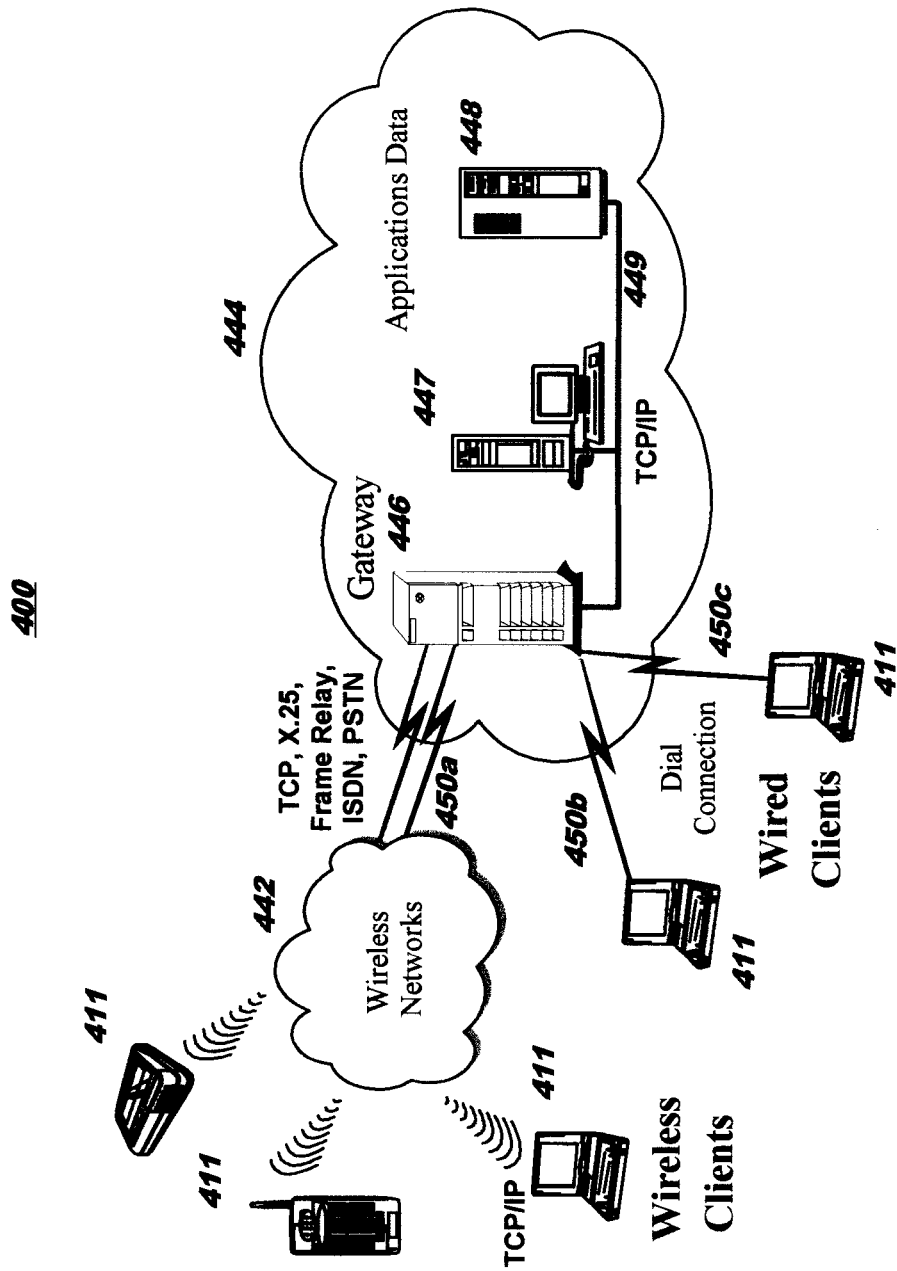
FIG. 4 depicts a representative networking environment in which one or more embodiments of the present invention may be used.

FIG. 4 illustrates a data processing network environment 400 in which the present invention may be practiced. The data processing network 400 may include a plurality of individual networks, such as wireless network 442 and wired network 444. A plurality of wireless devices 410 may communicate over wireless network 442, and a plurality of wired devices, shown in the figure (by way of illustration) as workstations 411, may communicate over network 444. Additionally, as those skilled in the art will appreciate, one or more local area networks ("LANs") may be included (not shown), where a LAN may comprise a plurality of devices coupled to a host processor.

Still referring to FIG. 4, the networks 442 and 444 may also include mainframe computers or servers, such as a gateway computer 446 or application server 447 (which may access a data repository 448). A gateway computer 446 serves as a point of entry into each network, such as network 444. The gateway 446 may be preferably coupled to another network 442 by means of a communications link 450a. The gateway 446 may also be directly coupled to one or more workstations 411 using a communications link 450b, 450c, and/or may be indirectly coupled to such devices. The gateway computer 446 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 446 may also be coupled 449 to a storage device (such as data repository 448).

Those skilled in the art will appreciate that the gateway computer 446 may be located a great geographic distance from the network 442, and similarly, the workstations 411 may be located some distance from the networks 442 and 444, respectively. For example, the network 442 may be located in California, while the gateway 446 may be located in Texas, and one or more of the workstations 411 may be located in Florida. The workstations 411 may connect to the wireless network 442 using a networking protocol such as the Transmission Control Protocol/Internet Protocol ("TCP/IP") over a number of alternative connection media, such as cellular phone, radio frequency networks, satellite networks, etc. The wireless network 442 preferably connects to the gateway 446 using a network connection 450a such as TCP or User Datagram Protocol ("UDP") over IP, X.25, Frame Relay, Integrated Services Digital Network ("ISDN"), Public Switched Telephone Network ("PSTN"), etc. The workstations 411 may connect directly to the gateway 446 using dial connections 450b or 450c. Further, the wireless network 442 and network 444 may connect to one or more other networks (not shown), in an analogous manner to that depicted in FIG. 4.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of ordering a search result, comprising:
  performing a search of network-accessible documents using a search query provided by a first user;
  obtaining a search result, responsive to the performing, the search result comprising an ordered sequence of identifications of a plurality of the network-accessible documents that match the search query;
  determining a social reputation score of the first user;
  automatically re-ranking the search result prior to displaying the search result to the first user, based on the determined social reputation score of the first user, comprising:
    for each of the plurality of network-accessible documents that match the search query, retrieving previously-stored reputation score information associated therewith, the associated reputation score information of the each document created from a social reputation score of at least one accessing user who previously accessed the each document, each of the at least one accessing user being distinct from the first user; and
    changing an order of at least one of the identified plurality of network-accessible documents within the ordered sequence, such that ones of the plurality of network-accessible documents for which the associated reputation score information most closely matches the social reputation score of the first user are prioritized in the changed order; and rendering, for the first user, the search result as re-ranked.

2. The method according to claim 1, wherein the social reputation score of the first user is based on evaluations of the first user by a plurality of other users of a social networking site.

3. The method according to claim 2, wherein:

the evaluations of the first user and the social reputation score of the first user are domain-specific; and the determined social reputation score corresponds to a domain that is relevant to the obtained search result.

4. The method according to claim 2, wherein the evaluation of the first user by each of the other users is weighted, for computing the social reputation score of the first user, based on a social reputation score of the other user.

5. The method according to claim 2, wherein the evaluations of the first user each comprise a recommendation of the first user by another of the users of the social networking site.

6. The method according to claim 1, wherein the social reputation score of the first user is based on contributions of the first user to a social networking site.

7. A system for ordering a search result, comprising:

a computer comprising a processor; and instructions which are executable, using the processor, to implement functions comprising:

performing a search of network-accessible documents using a search query provided by a first user;

obtaining a search result, responsive to the performing, the search result comprising an ordered sequence of identifications of a plurality of the network-accessible documents that match the search query;

determining a social reputation score of the first user;

automatically re-ranking the search result prior to displaying the search result to the first user, based on the determined social reputation score of the first user, comprising:

for each of the plurality of network-accessible documents that match the search query, retrieving previously-stored reputation score information associated therewith, the associated reputation score information of the each document created from a social reputation score of at least one accessing user who previously accessed the each document, each of the at least one accessing user being distinct from the first user; and changing an order of at least one of the identified plurality of network-accessible documents within the ordered sequence, such that ones of the plurality of network-accessible documents for which the associated reputation score information most closely matches the social reputation score of the first user are prioritized in the changed order; and rendering, for the first user, the search result as re-ranked.

8. The system according to claim 7, wherein the social reputation score of the first user is based on evaluations of the first user by a plurality of other users of a social networking site.

9. The system according to claim 8, wherein the evaluation of the first user by each of the other users is weighted, for computing the social reputation score of the first user, based on a social reputation score of the other user.

10. A computer program product for ordering a search result, the computer program product comprising:

a non-transitory computer readable storage medium having computer readable program code embodied therein, the computer readable program code configured for:

performing a search of network-accessible documents using a search query provided by a first user;

obtaining a search result, responsive to the performing, the search result comprising an ordered sequence of identifications of a plurality of the network-accessible documents that match the search query;

determining a social reputation score of the first user;

automatically re-ranking the search result prior to displaying the search result to the first user, based on the determined social reputation score of the first user, comprising:

for each of the plurality of network-accessible documents that match the search query, retrieving previously-stored reputation score information associated therewith, the associated reputation score information of the each document created from a social reputation score of at least one accessing user who previously accessed the each document, each of the at least one accessing user being distinct from the first user; and changing an order of at least one of the identified plurality of network-accessible documents within the ordered sequence, such that ones of the plurality of network-accessible documents for which the associated reputation score information most closely matches the social reputation score of the first user are prioritized in the changed order; and rendering, for the first user, the search result as re-ranked.

11. The computer program product according to claim 10, wherein the social reputation score of the first user is based on evaluations of the first user by a plurality of other users of a social networking site.

12. The computer program product according to claim 11, wherein the evaluation of the first user by each of the other users is weighted, for computing the social reputation score of the first user, based on a social reputation score of the other user.

* * * * *